United States Patent [19]

Fritsch

[11] Patent Number: 4,524,642
[45] Date of Patent: Jun. 25, 1985

[54] HIGH TORQUE INFINITELY VARIABLE EPICYCLIC TRANSMISSION

[76] Inventor: Joseph E. Fritsch, 14001 Sherwood, Oak Park, Mich. 48237

[21] Appl. No.: 446,589

[22] Filed: Jan. 17, 1983

[51] Int. Cl.³ .............................................. F16H 15/50
[52] U.S. Cl. ........................................ 74/796; 74/196; 74/793
[58] Field of Search ................ 74/690, 691, 721, 796, 74/798, 785, 788, 190, 190.5, 194, 196, 199, 208

[56] References Cited

U.S. PATENT DOCUMENTS

| | | | |
|---|---|---|---|
| 1,431,049 | 10/1922 | Schoonmaker | 74/196 |
| 1,771,807 | 7/1930 | Mitchell | 74/796 |
| 2,079,681 | 5/1937 | Chilton | 74/721 X |
| 2,836,994 | 6/1958 | Weber | 74/796 |
| 3,211,024 | 10/1965 | Maichen | 74/796 |
| 3,802,295 | 4/1974 | Lemmens | 74/796 |
| 3,822,610 | 7/1974 | Erban | 74/691 |
| 3,910,137 | 10/1975 | Nedeljkovitch | 74/796 |
| 4,026,166 | 5/1977 | Jackson | 74/691 |
| 4,112,787 | 9/1978 | Tippmann et al. | 74/798 |
| 4,266,446 | 5/1981 | Fritsch | 74/796 |
| 4,304,154 | 12/1981 | Townend | 74/796 |
| 4,435,997 | 3/1984 | van Doorne | 74/190.5 X |

FOREIGN PATENT DOCUMENTS 1025307  4/1966  United Kingdom ................. 74/796

Primary Examiner—Leslie A. Braun
Assistant Examiner—Dwight G. Diehl

[57] ABSTRACT

A high torque capacity infinitely variable transmission of the epicyclic type in which an input rotor is mounted on and rotates with the input shaft. A plurality of discs are rotatably supported by spindles which radiate outwardly from a spider hub which in turn is journaled and freely rotates about a portion of the input shaft. The axis of rotation of these discs lies in a common plane transverse to the axis of rotation of the input shaft and spider. The discs are in tractional engagement with the traction contact path radius of the input rotor and are driven around the traction contact path radius of the non-rotating traction ring thereby causing the discs to rotate about their axis in a direction of rotation opposite that of the input rotor and driving the spider about its axis in the same direction of rotation as the input rotor. Each disc is in driving relationship with a spindle gear. These spindle gears are in driving relationship with a sun gear which is mounted on and rotates with the output shaft. An infinitely variable change in the input/output ratio is achieved by displacing the traction ring axially. A change in the ratio range of the transmission is achieved by varying the pitch diameter ratio of the spindle gears to the sun gear.

29 Claims, 4 Drawing Figures

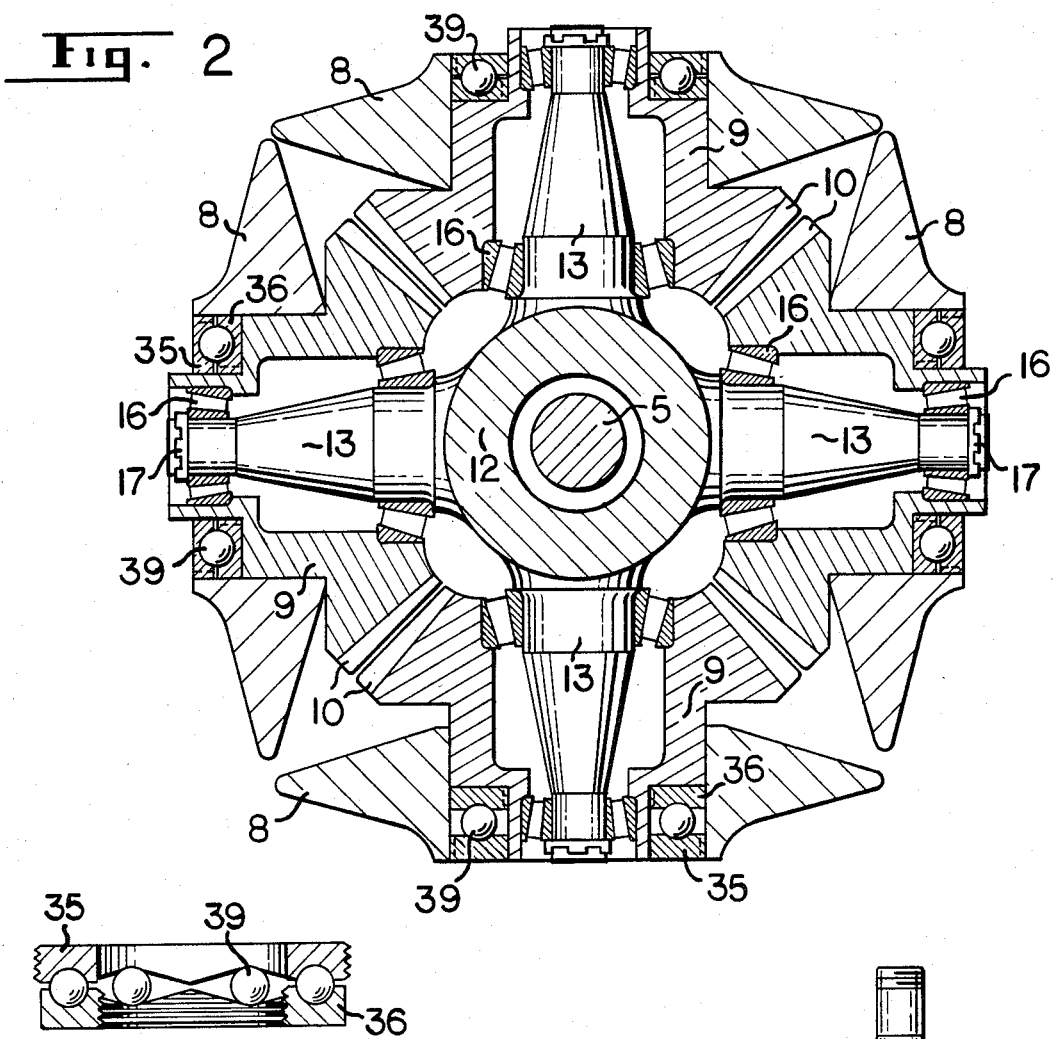
Fig. 2
Fig. 3
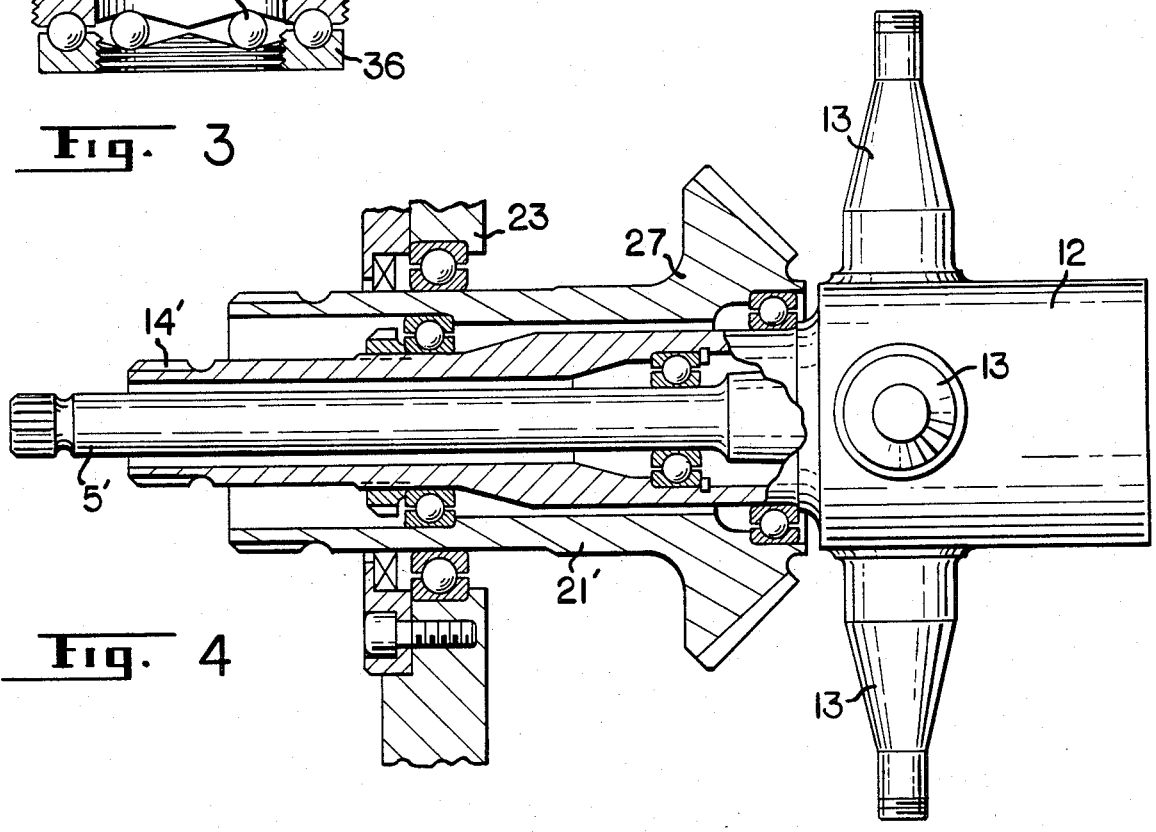
Fig. 4

HIGH TORQUE INFINITELY VARIABLE EPICYCLIC TRANSMISSION

TECHNICAL FIELD

The present invention relates generally to high torque infinitely variable traction drive transmissions, and more particularly to a dynamically balanced and load balanced high efficiency traction drive transmission of the transverse axis epicyclic type having a high power to weight ratio.

BACKGROUND OF THE INVENTION

Variable speed ratio traction drives are well known and have widespread use on applications where power capacity, efficiency and the power to weight ratio is not important. While these disadvantages would appear to be overcome in U.S. Pat. No. 4,266,446 issued May 12, 1981, it should be observed that the geometry of this design only permits the use of two planetary elements, of approximately the same diameter as the traction ring, to be used. In addition each planetary element has only one traction contact area which not only limits the power capacity but since this contact area is laterally offset with respect to the axis of rotation of the planetary element, the resultant moment force is high and requires large bearings and support members.

DISCLOSURE OF THE INVENTION

It is an object of the present invention to provide a dynamically balanced infinitely variable traction drive transmission in which the forces on all the rotating elements are balanced and which is capable of transmitting high torque.

More specifically it is an object of the present invention to provide a transmission using the epicyclic reduction principle whereby the highest input/output ratio is achieved as the radii of the elements approach similarity. This epicyclic reduction principle is combined in a unique transverse axis design whereby the greatest number of elements of similar size can be incorporated.

Another object of the present invention is to provide a transmission of the type set forth above having traction elements of approximately the same radius whereby maximum torque can be transmitted from a given tangential force.

Another object of the present invention is to reduce the rotating speed of the traction elements. The easily balanced input rotor being the only component rotating at input shaft speed.

A further object of the present invention is to provide balanced loading on the traction elements and significantly reduce the weight of the rotating components thereby reducing the moment of enertia of the transmission which also reduces the forces on the bearings and their support members.

A still further object of the present invention is to provide a transmission having traction element gears designed to withstand high transverse loading thereby increasing their load transmitting capacity.

A still further object of the present invention is to increase the number of input traction elements and the number of traction contact areas on each element in order to decrease the size and improve the shape of these areas thereby increasing the overall efficiency of the present invention.

The foregoing objects, and other objects and advantages which will become apparent are achieved by providing concentric input and output shafts having end portions extending into a housing, an input rotor rotatable with the input shaft, a plurality of spindles radiating outwardly from a spider which is coaxial with and rotatably supported by the center portion of the input shaft. Each of the spindles in turn rotatably supporting a traction disc. The traction disc peripheral surface being engaged in traction with the inwardly facing traction contact paths of the input rotor and the non-rotating traction ring. Axially shifting the traction ring relative to the input rotor changes the traction contact path radius of the traction ring and the input rotor whereby the output speed ratio of the transmission may be varied. Each of the traction discs are in driving relationship through a cylinder with a gear. These gears in turn are interconnected with gearing rotatable with the output shaft in driven relationship. A direct drive output shaft may be disposed coaxially within the varible speed output shaft.

An advantage of the foregoing construction is that the convex periphery traction surface of the traction disc will nest into the concave traction surfaces of the input rotor and the traction ring thereby forming a traction contact shape whose major axis is paralell to the direction of the tangential force.

Another advantage of this invention is that there are two traction contact areas on each traction disc thereby not only balancing the forces on each traction disc but equally important, reducing the tangential force required to transmit a given input torque by half. This in turn reduces the overall size and increases the efficiency of the transmission.

The foregoing features will be more fully understood after consideration of the following detailed description taken in conjuction with the accompanying drawings, in which:

BRIEF DESCRIPTION OF DRAWINGS

FIG. 2 is a cross-sectional view taken substantially on line 2—2 in FIG. 1.

FIG. 3 is a side cross-sectional view illustrating the torque dependent load device.

FIG. 4 is a cross-sectional view through an alternate embodiment, showing only those parts which differ from the preferred embodiment shown in FIG. 1.

DETAILED DESCRIPTION

Figure 1:
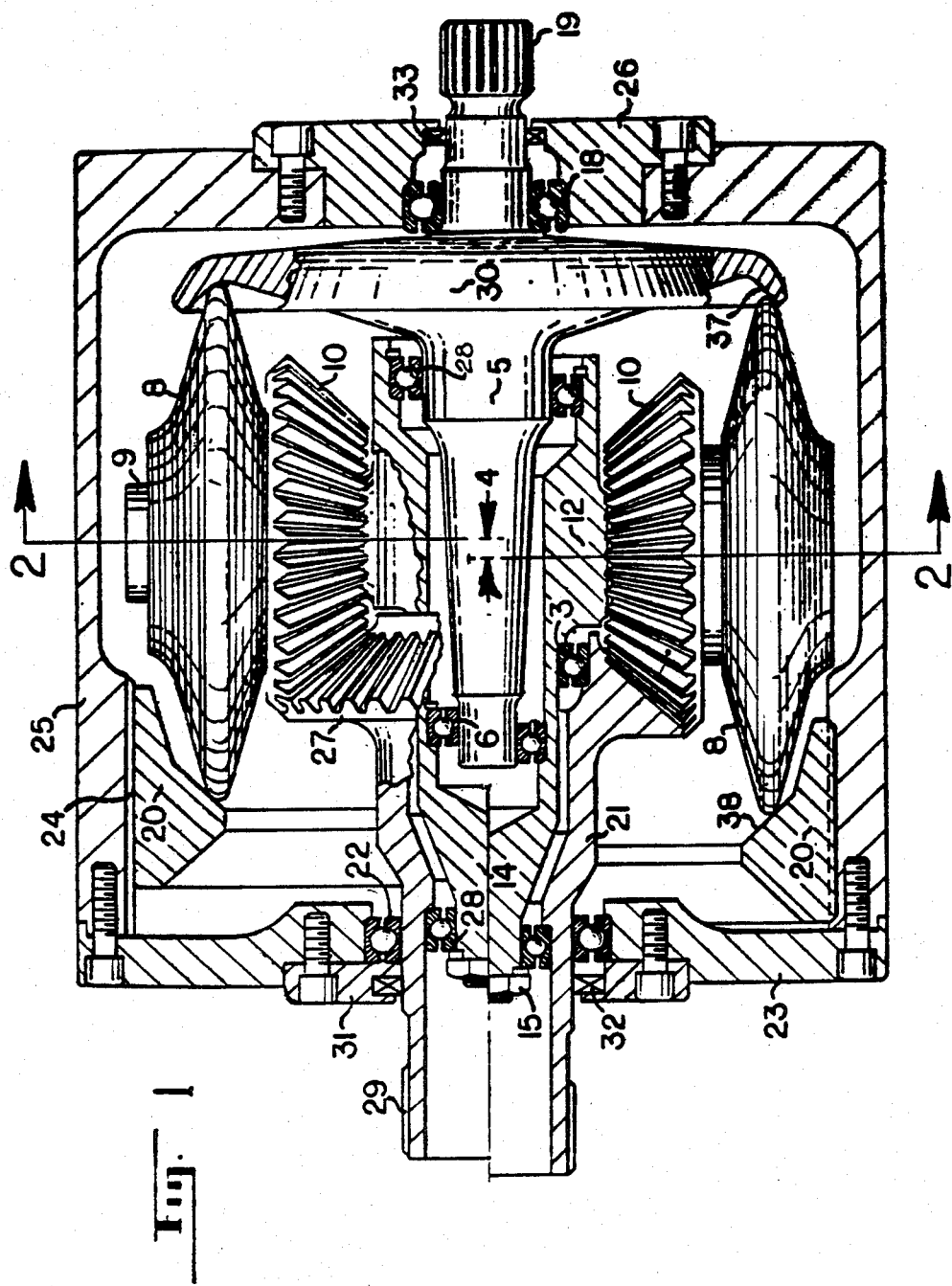
FIG. 1 is a cross-sectional view through the preferred embodiment of a transmission embodying the features of the present invention.

Referring first to FIG. 1, a housing is indicated generally at 25, the housing including an input bearing cap 26 containing a bearing 18 rotatably supports the input shaft 19. The input bearing cap also supports the input shaft seal 33. The housing 25 also includes a cover 23 containing the output shaft bearing 22 and output shaft cap 31 which in turn contains the output shaft seal 32. The input rotor 30 is formed integrally with the input shaft 19 and center shaft 5 in the preferred embodiment. It must be appreciated that the input rotor could be made as an individual component. The traction surface 37 of the input rotor is inclined inwardly. The spider 12 is rotatably supported on the center shaft 5 by bearings 6 and 7. It must be appreciated that while these bearings are on the fastest rotating part of the present invention, the spider rotates in the same direction and at one half the center shaft speed so that, in effect these bearings are turning at one half the input shaft speed. These bearings allow axial movement of the spider on the center shaft which automatically balances the normal load equally between the rotor and the traction ring.

Referring now to FIG. 2 which is a sectional view taken through line 2—2 in FIG. 1: The spider 12 has spindles 13 radiating outward at spaced intervals around the circumference of the tubular hub portion of the spider and perpendicular to the spider centerline. Four spindles are used in the preferred embodiment but less than or more than four could be used. Each spindle rotatably supports a cylinder 9 with bearings 16. A retaining device 17 such as a nut holds the assembly together. A spindle gear 10 is rigidly attached to the inner end of each cylinder 9. Each cylinder rotatably and slidably supports a traction disc 8. The traction discs are automatically maintained in driving relationship with the cylinders by the torque dependent traction load device. A male ring member 35 is rigidly secured within each traction disc. Likewise a female ring member 36 is rigidly secured on each cylinder 9. The end surfaces, of these ring members, facing each other have oppositely inclined sloping surfaces. Cooperating with these sloping surfaces are balls 39 which are spaced apart from each other by means such as a ball cage. The stability of the traction discs has been increased by locating the traction load device outwardly on the cylinder.

FIG. 3 shows a side view of the torque dependent traction load device. It must be appreciated that the angle and shape of the inclined sloping surfaces depends upon the design use of the present invention whereby the normal force can be proportioned to the required tangential force. Similarly, rollers may be utilized instead of balls.

Referring now back to FIG. 1, the spider 12 has an extension located generally at 14. This extension is rotatably supported by bearing 28 which is one of a pair, the other bearing is located at 3. These bearings also serve to rotatably support the output shaft generally located at 21. They also maintain the spacial relationship between the spider and the output shaft. A retaining device 15 such as a nut holds this assembly together. The purpose of extension 14 is to increase the structural support of the center shaft 5, the spider 12 and the output shaft 21 which are coaxial with each other, by increasing the distance between bearing 28 and bearing 3 and by locating bearing 28 radially adjacent to bearing 22. The output shaft 21 contains a sun gear 27 which is in driven engagement with spindle gears 10. While the sun gear is shown integral with the output shaft, it should be appreciated that it could be made as an individual component. It should further be appreciated that the spindle gears and the output shaft sun gear could be replaced with traction wheels.

Although the output shaft 21 must move axially with the spider 12, splines 29 are provided for this purpose. It must be appreciated that this movement could be within the housing with means provided to couple the moveable shaft to an axially rigid output shaft extending outwardly through the housing.

The traction ring 20 is slidably supported within the housing 25 coaxial with the output shaft. It is prevented from revolving by means such as splines 24. The traction surface 38 of the traction ring is inclined inwardly and its shape is symetrically opposite to that of the traction surface 37 of the input rotor. The traction ring can be moved axially. This axial movement alters the effective traction contact path radii of the traction ring and the input rotor thereby changing the input/output ratio of the transmission.

In operation, assuming that the input rotor 30 is rotating clockwise at the same speed as the input shaft, the periphery surface of the traction disc 8 is in tractive engagement with the inwardly confronting surface 37 of the input rotor and the inwardly confronting surface 38 of the non-rotating traction ring 20. The axis of rotation of the traction discs lies in a plane which is transverse to the axis of rotation of the input shaft and input rotor. The traction discs rotate clockwise with the spider 12 relative to the input shaft axis at one half input shaft speed and simultaneously rotate counter-clockwise relative to their spindle 13 axis at approximately one half input shaft speed. Since the spindle gears 10 are in driven relationship with the traction discs, they rotate at the same speed and direction. Assuming that the output shaft sun gear 27 has the same pitch diameter as the spindle gears 10 and also assuming the traction contact path radii of the input rotor and the traction ring are equal to the radii of the traction discs, each revolution of the traction discs counter-clockwise would drive the spider assembley one revolution clockwise which in turn would result in zero output shaft speed. Stated in another way, an infinite speed reduction will be achieved.

A change in the transmission ratio is effected by displacing the traction ring 20 in an axial direction. The menas used for moving the traction ring is not shown. As the traction ring moves in a direction away from the input rotor 30, the balls 39 in the torque dependent traction load maintaining device shown in FIG. 3 climb up the inclined cooperating surfaces of the female ring member 36 and the male ring member 35, thereby increasing the traction contact path radius of the spider assembly while simultaneously controlling the contact pressure exerted by the traction disc 8 upon the input rotor 30 and the traction ring 20.

The change in the relationship of the components when the speed ratio of the present invention is varied can be seen by comparing the top and bottom halves of FIG. 1. The top configuration represents a high input/output ratio. The bottom configuration represents a low input/output ratio. The spider 12 which is free to move in an axial direction over distance indicated by arrows 4 maintains its relationship with the geometric center thereby automatically balancing the forces on the traction discs. With the components in the position shown on the lower half of FIG. 1 each revolution of the traction discs in the counter-clockwise direction would drive the spider assembly clockwise one revolution minus the difference between the circumference of the traction path of the traction discs and the circumference of the traction path of the input rotor and the traction ring. The output shaft 21 would turn counter-clockwise this fractional difference, assuming that the output shaft sun gear 27 has the same pitch diameter as the spindle gears 10. Altering the ratio of the output gears results in a zero shift and a change in the ratio range of the present invention.

It should be observed that as the input/output ratio increases, the length of the rolling traction contact between the discs and the rotor and traction ring also increases proportionately, and therefore, this permits a greater torque to be transmitted at reduced output speeds from a constant tangential force.

It should also be observed that the traction elements are only used on the high surface speed, low torque input portion of the present invention and gears are used on the high torque, low speed output portion.

An alternate configuration of the present invention is shown in FIG. 4 wherein the spider extension 14' has a tubular shape which extends through and is coaxial with the output shaft 21. This spider extension shaft can be used as a second output shaft which rotates at a constant one half input shaft speed. A third output shaft can be provided by extending the center shaft 5' through and coaxial with the spider extension shaft 14' and the output shaft 21'. Since this centershaft is part of the input shaft, it serves as a direct drive output shaft. It must be appreciated that the centershaft 5' could be used for input.

While the above description contains many specificities, these should not be construed as limitations on the scope of the invention, but rather as an exemplification of one preferred embodiment thereof. Many other variations are possible for example the spider extension 14' shown in FIG. 4 could be used as an input shaft with the input rotor used only as a load balancing means.

What is claimed as new and desired to be secured by Letters Patent is:

1. A high torque infinitely variable epicyclic transmission comprising:
   a housing;
   input and output shafts having end portions extending into said housing and rotating about a first axis of rotation;
   a rotor rotatable with said input shaft and in spaced relation with an axially shiftable traction ring having means preventing rotary motion;
   said rotor and said traction ring having inwardly facing means for conveying rotational energy;
   outer diameter of said rotor means for conveying rotational energy inclined inwardly forming a generally dished cross sectional shape;
   outer diameter of said traction ring means for conveying rotational energy being inclined inwardly forming a generally dished cross sectional shape;
   said dished cross sectional shape of said rotor means and said traction ring means effecting a continuously increasing amount of torque to be transmitted from said input shaft to said output shaft as the input/output ratio between the said shafts increases;
   a spider arranged to rotate about said first axis of rotation having a plurality of spindles radiating outwardly and each said spindle rotatably supporting a disc having means for conveying rotational energy;
   said discs being in driven relationship with said rotor and said traction ring;
   means for transmitting the rotary movement from the said discs to the said output shaft.

2. The high torque infinitely variable epicyclic transmission set forth in claim 1 wherein a portion of said input shaft is journaled for rotation within said spider.

3. The high torque infinitely variable epicyclic transmission set forth in claim 2 wherein a portion of said spider is journaled for rotation within the output shaft.

4. The high torque infinitely variable epicyclic transmission set forth in claim 3 wherein an extension of said spider is used as a second output shaft.

5. The high torque infinitely variable epicyclic transmission set forth in claim 3 wherein an extension of the input shaft is used as a second output shaft.

6. The high torque infinitely variable epicyclic transmission set forth in claim 1 wherein said spider comprises a plurality of spindles in spaced relationship radiating outwardly from a hub portion wherein the axis of said spindles lie in a common plane perpendicular to the first axis of rotation.

7. The high torque infinitely variable epicyclic transmission set forth in claim 1 wherein a plurality of cylinders are rotatably supported by a plurality of said spindles, said cylinders each have a first end portion provided with a gear and a second end portion supporting a first half portion of a torque dependent loading means.

8. The high torque infinitely variable epicyclic transmission set forth in claim 7 wherein a plurality of said cylinders rotatably and slidably support a plurality of discs, each said disc supports a second half portion of said torque dependent loading means.

9. The high torque infinitely variable epicyclic transmission set forth in claim 8 wherein said discs are axially shiftable with respect to said cylinders, and further characterized by the provision of driving balls disposed between each of said first half portion and said second half portions of said torque dependent loading means, said driving balls cooperating with sloping surfaces of said first half portion and said second half portions of said torque dependent loading means thereby providing the normal force between said discs and the rotor and traction ring and to simultaneously maintain the said discs in driving relationship with said cylinders.

10. The high torque infinitely variable epicyclic transmission set forth in claim 9 wherein the periphery of said discs are provided with a traction surface.

11. The high torque infinitely variable epicyclic transmission set forth in claim 1 wherein means are provided for balancing the normal force equally between the said rotor and the said traction ring.

12. The high torque infinitely variable epicyclic transmission set forth in claim 1 wherein the radii of said discs are substantially the same as the radii of the said rotor and said traction ring.

13. The high torque infinitely variable epicyclic transmission set forth in claim 1 wherein said means for transmitting the rotary movement from the said discs to the said output shaft is further defined as a plurality of gears driveable by the plurality of said discs in driving relationship with gearing rotatable with the said output shaft.

14. A high torque infinitely variable epicyclic transmission comprising:
   a housing;
   input and output shafts having end portions extending into said housing and rotating about a first axis of rotation;
   a rotor rotatable with said input shaft about said first axis of rotation;
   a traction ring coaxial with said first axis of rotation in spaced relation with said rotor;
   said traction ring axially shiftable within said housing having means preventing rotary motion;
   said rotor and said traction ring having inwardly facing traction surfaces;
   outer diameter of said rotor traction surface being inclined inwardly and forming a generally dished cross sectional shape;

outer diameter of said traction ring traction surface being inclined inwardly and forming a generally dished cross sectional shape;

said dished cross sectional shape of said rotor means and said traction ring means effecting a continuously increasing amount of torque to be transmitted from said input shaft to said output shaft as the input/output ratio between the said shafts increases a spider rotatable about said first axis of rotation having a plurality of spindles radiating outwardly;

a plurality of cylinders rotatably supported by said plurality of spindles;

a plurality of discs rotatably and slidably carried by said plurality of cylinders, each said disc in driving relationship with each of the said cylinders through a torque dependent traction loading means;

each said disc having a traction surface portion engaged in driven relationship with said inwardly facing traction surfaces of said rotor and said traction ring;

a plurality of gears in driven relationship with said plurality of cylinders;

gearing rotatable with said output shaft and in driven relationship with said plurality of gears.

15. The high torque infinitely variable epicyclic transmission set forth in claim 14 wherein an extension of said spider is used as a second output shaft.

16. The high torque infinitely variable epicyclic transmission set forth in claim 14 wherein an extension of said input shaft is used as an output shaft.

17. The high torque infinitely variable epicyclic transmission set forth in claim 14 wherein the axis of said spindles lie in a common plane perpendicular to the first axis of rotation.

18. The high torque infinitely variable epicyclic transmission set forth in claim 14 wherein said discs are axially shiftable with respect to said cylinders, and further characterized by the provision of driving balls disposed between a first half portion and a second half portion of said torque dependent loading means thereby providing the normal force between said discs and the said rotor and said traction ring and to simultaneously maintain the said discs in driving relationship with said cylinders.

19. The high torque infinitely variable epicyclic transmission set forth in claim 14 wherein means are provided for balancing the normal force equally between the said rotor and the said traction ring.

20. The high torque infinitely variable epicyclic transmission set forth in claim 14 wherein a tubular portion of said spider is journaled for rotation within said output shaft.

21. The high torque infinitely variable epicyclic transmission set forth in claim 20 wherein said input shaft portion includes a center shaft portion journaled for rotation within said tubular portion of said spider.

22. A high torque infinitely variable epicyclic transmission comprising:

a housing;

input and output shafts having end portions extending into said housing and rotating about a first axis of rotation;

said input shaft end portion including a center shaft portion;

a rotor rotatable with said input shaft about said first axis of rotation;

a traction ring coaxial with said first axis of rotation in spaced relation with said rotor and slidably disposed within said housing having means preventing rotary motion; means for axially shifting said traction ring;

said rotor and said traction ring having inwardly facing traction surfaces;

outer diameter of said rotor traction surface being inclined inwardly and forming a generally dished cross sectional shape;

outer diameter of said traction ring traction surface being inclined inwardly and forming a generally dished cross sectional shape;

said dished cross sectional shape of said rotor means and said traction ring means effecting a continuously increasing amount of torque to be transmitted from said input shaft to said output shaft as the input/output ratio between the said shafts increases;

a spider rotatably and slidably supported by said center shaft portion having a plurality of spindles radiating outwardly from a hub portion wherein the axis of said spindles lie in a common plane;

a plurality of cylinders rotatably supported by the said plurality of spindles;

a plurality of spindle gears mounted on the first end portion of said plurality of cylinders;

a plurality of discs rotatably and slidably carried by the said plurality of cylinders, each said disc in driving relationship with each of the said cylinders through a torque dependent traction loading means;

each said disc having a traction surface portion engaged in driven relationship with the inwardly facing traction surfaces of the said rotor and said traction ring;

gearing rotatable with said output shaft and in driven relationship with said plurality of spindle gears.

23. The high torque infinitely variable epicyclic transmission set forth in claim 22 wherein said spider comprises a plurality of said spindles in spaced relationship, radiating outwardly from a hub portion wherein the axis of said spindles lie in a common plane perpendicular to the first axis of rotation.

24. The high torque infinitely variable epicyclic transmission set forth in claim 22 wherein a plurality of cylinders each having a first end portion provided with said spindle gear and a second end portion supporting a first half portion of a torque dependent loading means.

25. The high torque infinitely variable epicyclic transmission set forth in claim 22 wherein a plurality of said cylinders rotatably and slidably support a plurality of said discs, each said disc supporting a second half portion of a torque dependent loading means.

26. The high torque infinitely variable epicyclic transmission set forth in claim 25 wherein said discs are axially shiftable with respect to said cylinders, and further characterized by the provision of driving balls disposed between each of said first half portion and said second half portion of said torque dependent loading means.

27. The high torque infinitely variable epicyclic transmission set forth in claim 22 wherein means are provided for balancing the normal force generated by the torque dependent loading means equally between the said rotor and the said traction ring.

28. The high torque infinitely variable epicyclic transmission set forth in claim 22 wherein a tubular portion of said spider is journaled for rotation within said output shaft.

29. The high torque infinitely variable epicyclic transmission set forth in claim 28 wherein the said center shaft is journaled for rotation within said tubular portion of said spider.

* * * * *